United States Patent [19]
Bhatti et al.

[11] 4,348,216
[45] Sep. 7, 1982

[54] METHOD AND APPARATUS FOR FORMING GLASS FIBERS

[75] Inventors: Mohinder S. Bhatti; Alfred Marzocchi, both of Newark, Ohio

[73] Assignee: Owens-Corning Fiberglas Corporation, Toledo, Ohio

[21] Appl. No.: 200,650

[22] Filed: Oct. 27, 1980

[51] Int. Cl.³ ............................................ C03B 37/025
[52] U.S. Cl. ...................... 65/1; 29/163.5 R; 65/2; 65/374.12; 219/121 EM; 428/670; 428/940
[58] Field of Search ............... 65/1, 2, 374, 12; 29/163.5 R; 219/121 EM; 428/670, 940

[56] References Cited

U.S. PATENT DOCUMENTS

| | | | |
|---|---|---|---|
| 2,555,372 | 6/1951 | Ramage | 204/38 |
| 2,777,254 | 1/1957 | Siefert et al. | |
| 3,132,928 | 5/1964 | Crooks et al. | 29/198 |
| 3,134,659 | 5/1964 | Labino | 65/2 |
| 3,147,547 | 9/1964 | Kuebrich et al. | 29/528 |
| 3,206,846 | 9/1965 | Slayter et al. | 29/470 |
| 3,235,646 | 2/1966 | Sens | 13/6 |
| 3,248,190 | 4/1966 | Woodward et al. | 65/1 |
| 3,371,409 | 3/1968 | Bonnet et al. | 29/528 |
| 3,461,058 | 12/1969 | Westfield et al. | 204/290 |
| 3,480,523 | 11/1969 | Tyrrell | 204/43 |
| 3,511,306 | 5/1970 | Warkoczewski | 65/15 |
| 3,518,066 | 6/1970 | Bronnes et al. | 29/195 |
| 3,657,784 | 4/1972 | Selman et al. | 29/195 |
| 3,736,109 | 5/1973 | Darling et al. | 29/195 |
| 3,741,735 | 6/1973 | Buttle | 29/198 |
| 3,827,953 | 8/1974 | Haldeman | 204/37 R |
| 3,875,028 | 4/1975 | Atlee et al. | 204/37 R |
| 3,947,333 | 3/1976 | Bianchi et al. | 204/129 |
| 3,971,646 | 7/1976 | Rhodes | 65/157 |
| 3,973,920 | 8/1976 | Tadokoro et al. | 29/194 |
| 4,066,864 | 1/1978 | Heitmann | 219/121 EM |
| 4,105,828 | 8/1978 | Borchert et al. | 428/665 |
| 4,140,507 | 2/1979 | Costin et al. | 65/2 |

FOREIGN PATENT DOCUMENTS

| | | | |
|---|---|---|---|
| 1033627 | 6/1966 | United Kingdom | 65/1 |
| 1242921 | 8/1971 | United Kingdom | 65/1 |

OTHER PUBLICATIONS

Hot Isostatic Processing, MCIC-77-34, Battele Labs, Columbus, Ohio, Nov. 1977, pp. 1-99.

*Primary Examiner*—Robert L. Lindsay, Jr.
*Attorney, Agent, or Firm*—Ronald C. Hudgens; Robert F. Rywalski; Greg Dziegielewski

[57] ABSTRACT

A laminated wall for a feeder for supplying molten streams of glass to be attenuated into fibers is provided comprising a refractory metal core having an oxygen impervious, precious metal sheath intimately bonded thereto by hot isostatic pressing, said core having an insert therein having at least one orifice extending therethrough adapted to pass said molten material therethrough.

24 Claims, 6 Drawing Figures

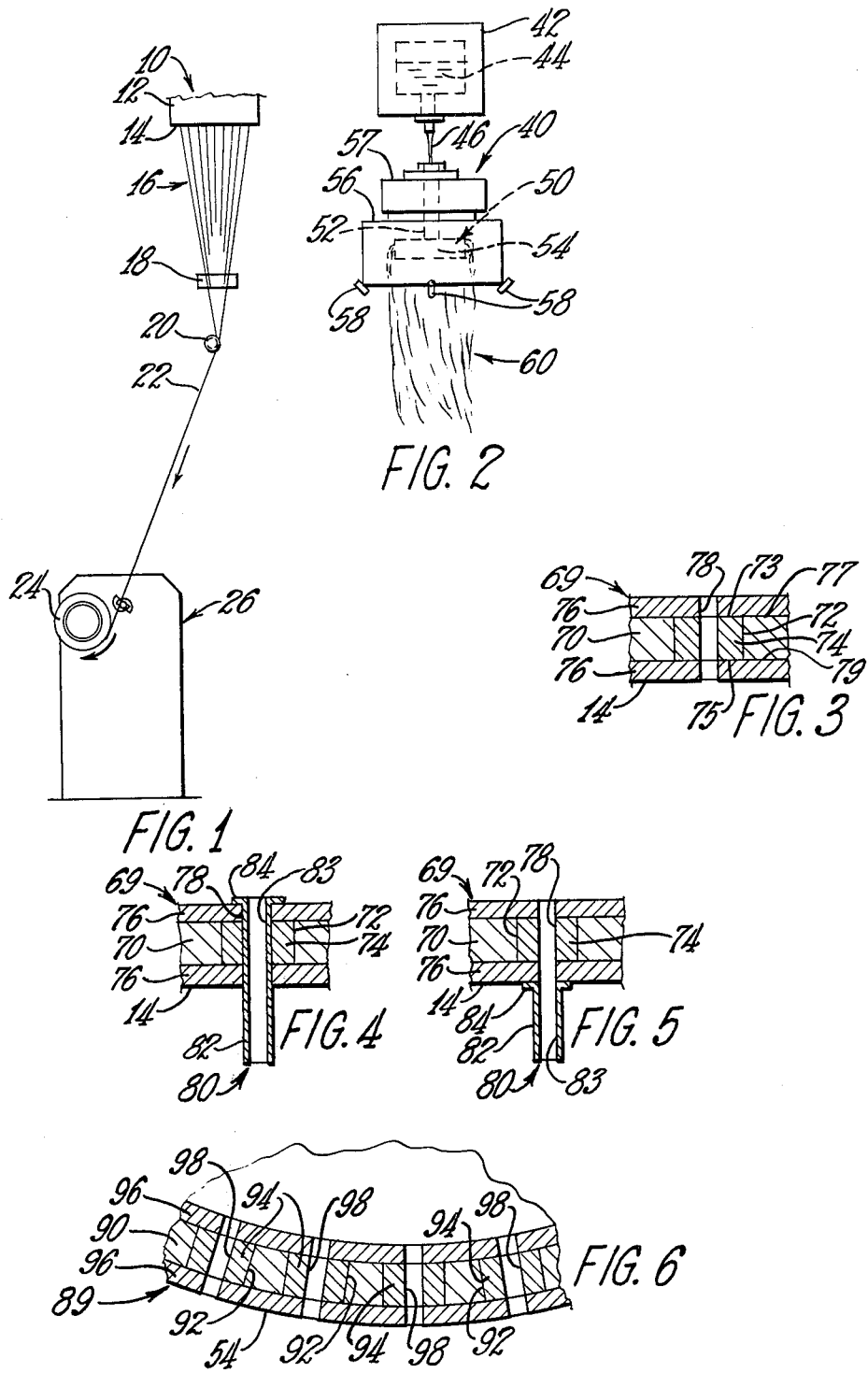

METHOD AND APPARATUS FOR FORMING GLASS FIBERS

TECHNICAL FIELD

The invention disclosed herein relates to a glass fiber forming feeder having at least one laminated wall comprised of a refractory metal substrate having an oxygen impervious, precious metal sheath intimately bonded thereto by means of hot isostatically pressing the precious metal sheath to the refractory metal substrate.

BACKGROUND ART

There has been a long-felt need to produce a long lasting feeder for flowing streams of molten inorganic material, such as glass, at operating temperatures higher than currently practiced.

Much of the previous work was directed to forming alloys having superior properties over the unalloyed metals. Feeders in the textile art, or fixed bushing art, have historically been made from alloys of platinum and rhodium. Feeders in the wool art, or rotatable feeders, have been produced employing Cobalt based alloys.

The present invention provides inorganic fiber forming feeders wherein the high temperature strength characteristics of refractory metals are combined with the oxidation resistance of precious metals to produce feeders capable of operating at temperatures higher and for longer periods of time than heretofore commercially practicable.

DISCLOSURE OF THE INVENTION

This invention pertains to a laminated wall for a feeder for supplying molten streams of inorganic material to be attenuated into filaments comprising a refractory metal core having an oxygen impervious precious metal sheath intimately bonded thereto by hot isostatic pressing, said wall having at least one orifice extending therethrough adapted to pass said molten material therethrough.

BRIEF DESCRIPTION OF THE DRAWINGS

FIG. 1 is a semi-schematic front elevational view of a glass textile type fiber forming system.

FIG. 2 is a semi-schematic front elevational view of a glass wool or rotary fiber forming system.

FIG. 3 is an enlarged cross sectional view of the orificed walls of the stream feeders shown in FIGS. 1 and 2.

FIG. 4 is an enlarged cross sectional view of a portion of the feeder wall similar to FIG. 3 having a hollow tubular member inserted therethrough.

FIG. 5 is an enlarged cross sectional view of a feeder wall similar to that shown in FIG. 3 having a hollow tubular member externally attached thereto.

FIG. 6 is a cross sectional view of the feeder wall of the fiber forming system shown in FIG. 2.

BEST MODE OF CARRYING OUT THE INVENTION

As shown in FIG. 1, feeder 10, which is comprised of containment or sidewalls 12 and a bottom, working or stream defining wall 14, is adapted to provide a plurality of streams of molten inorganic material, such as glass. The streams of molten glass can be attenuated into filaments 16 through the action of winder 26.

As is known in the art, size applicator means 18 is adapted to provide a coating or sizing material to the surface of the glass filaments which advance to gathering shoe or means 20 to be gathered into a strand or bundle 22. Strand 22 is then wound into package 24 upon a collet of winder 26. Thus, FIG. 1 schematically represents a "textile" fiber forming system.

As shown in FIG. 2, rotary system 40 is comprised of a flow means or channel 42 having a body of molten inorganic material 44, such as glass, therein. A stream of molten glass 46 is supplied to rotary feeder or rotor 50 from channel 42, as is known in the art.

Rotor 50, which is adapted to be rotated at high speeds, is comprised of a quill 52 and a circumferential stream defining or working wall 54 having a plurality of orifices 78 or passageways 98 therethrough adapted to supply a plurality of streams of molten inorganic material to be fiberized.

In conjunction with rotor 50, a shroud 56 and circumferential blower or fluidic attenuation means 57 are adapted to fluidically assist in the attenuation of the streams of molten material into fibers or filaments 60. A binder material or coating may be applied to fiber 60 by means of binder applicators 58, as is known in the art.

As is shown in the drawings, the fiberization or working walls 14 and 54 of the feeders 10 and 50 should be based upon laminate comprised of a refractory metal core having an oxygen impervious, precious metal sheath intimately bonded thereto by hot isostatic pressing (i.e. HIP) as is disclosed in concurrently filed U.S. patent application Ser. No. 200,677, filed on Oct. 27, 1980, in the name of Mohinder S. Bhatti, which is hereby incorporated by reference.

Particularly, such refractory metals are selected from the group of materials consisting of molybdenum (Mo), columbium (Cb), tungsten (W), rhenium (Re), tantalum (Ta), hafnium (Hf), titanium (Ti), chromium (Cr), zirconium (Zr), vanadium (V) and base alloys of such refractory metals. For example, an alloy of molybdenum, titanium and zirconium, known as TZM, has been shown to provide a superior laminated wall for a fiber forming feeder when clad with a precious metal alloy of platinum and rhodium.

Particulary, the precious metals are selected from a group consisting of platinum (Pt), paladium (Pd), iridium (Ir), osmium (Os), rhodium (Rh), ruthenium (Ru), and alloys based on such metals. Included in the platinum alloys and H alloy and J alloy which are alloys of platinum and rhodium of 90%/10% and 75%/25% composition, respectively.

As disclosed in the aforementioned concurrently filed patent application, care should be taken in the preparation of the surfaces of the substrate and precious metal layers to insure a good bond between the core and sheath.

Simply stated, the sheath is formed to closely conform to the exterior of the core, with the surfaces thereof being approximately cleaned to promote a good metallurgical bond therebetween. The core is inserted or enclosed within the sheath to form a prelaminate unit having at least one edge or portion thereof open to the atmosphere to facilitate "out gasing". Then the prelaminate unit is heated in a vacuum to "out gas" the unit. Subsequent to the out gasing, the open edge or seams of the unit are welded or sealed in a vacuum, whereupon the unit is ready to be hot isostatically pressed to form laminate 69.

As shown in FIG. 3, bottom wall 14 is comprised of a laminant 69 adapted to flow molten glass therethrough. As such, core or substrate 70 is provided with a plurality of apertures 72 therethrough by any suitable means, such as drilling.

An insert or element 74 is positioned in or press fit into each of the apertures 72 in core 70. To ensure a snug fit between the element 74 and core 70 a press fit is preferred. The planar end surfaces 73 and 75 of element 74 should be substantially flush or coplanar with the planar surfaces of the core 70. That is, preferably, the plugs are formed having an axial height substantially equal to the thickness of core 70. Each element can be a cylindrically shaped solid plug of precious metal adapted to snugly fit within each aperture 72. If the plug is longer than the thickness of core 70, any excess insert extending out of aperture 72 is preferably removed.

Subsequent to the insertion of elements 74, a sheath 76 is fabricated or formed around core 70. Sheath 76 should be formed of a precious metal as set forth in the aforementioned concurrently filed patent application.

That is, sheath 76 should be comprised of a "picture or window frame" of precious metal around the lateral edges of the core sandwiched between a pair of precious metal plates which are welded or joined together so as to hermetically seal the interior of the unit from the atmosphere and/or HIP'ing fluid. Then the unit is hot isostatically pressed to form a laminate 69 having superior high temperature strength and creep characteristics capable of function in an oxidizing atmosphere at elevated temperatures, for example temperatures above 1000° C., such as encountered in the fiberization of glass filaments.

As shown in the drawings, the substantially parallel or end surfaces 73 and 75 of each element or plug 74 are intimately bonded to the interior surfaces 77 and 79 of sheath 76 after HIP'ing. Each of the end surfaces of each plug being substantially coplanar with the side of sheath 76 associated therewith.

At least one orifice 78 is formed through element 74, preferably, without exposing any of the refractory metal core 70 to form working wall 14.

Working wall 14 can be combined with sidewalls 12 to form a textile type feeder 10 having a tipless bottom wall. Or, a hollow tubular member or tip 80 can be attached to the laminate 69 to form a "tip-type" working wall 14 as shown in FIGS. 4 and 5. Preferably, the hollow tubular member 80 and element 74 are also formed of one of the aforementioned precious metals or base alloys thereof, such as platinum.

As shown in FIG. 4, the shaft 82 of hollow tubular member 80 is positioned within orifice 78 of laminate 69. Further, the flange 84 of member 80 is positioned in abutting engagement with one side of sheath 76 and is subsequently sealed to said sheath 76 by any suitable means such as by electron beam or laser welding.

The portion of shaft 82 extending beyond the opposite surface of sheath 76 forms the "tip" and passageway 83 through member 80 is adapted to permit the passage of molten glass or inorganic material therethrough to issue a stream therefrom.

Preferably, instead of electron beam or laser welding flange 84 to sheath 76, hollow tubular member 80 can be gas pressure welded or HIP welded to laminate 69, in conformance with the Metals and Ceramics Information Center Report No. MCIC-77-34 published by the Battelle Columbus Laboratories in Nov. 1977.

With the tubular member 80 inserted in the laminate 69 as shown in FIG. 4, the laminate 69 and all such members 80 are placed inside a sheet metal container having a pressure transmitting media tightly packed between the container and the laminate 69 and in the passageway 83 of each tubular member 80. That is, the pressure transmitting media is tightly packed in all the space within the container not occupied by the laminate 69 and tubular members 80.

The pressure transducing or transmitting media can be of the type known in the art such as powdered metal, beaded glass such as Vycor, or amorphous silica. Preferably, passageways 83 are snugly fitted with a solid or fully densified rod of the pressure transducing media, metal or silica, which fluidizes or softens upon the application of heat and pressure during the HIP'ing process as should the rest of the transmitting medium, to insure a full application of pressure to the walls of shaft 82 to intimately bond the exterior of shaft 82 to the interior of element 74.

Preferably, the pressure transmitting media should not become, so fluid so as to "wick" or flow between the surfaces to be bonded together.

Subsequently, the pressure transmitting media is removed by any suitable means, such as leaching.

It is to be noted that the elements 74 and/or members 84 may be HIP welded to laminate 69 and/or each other if the flanges 78, 79 and 87 are hermetically sealed or welded (e.g. EB welded) to laminate 69, in the argon fluid of a conventional HIP'ing system. That is, the sheet metal box and special pressure transducing media may be dispensed with.

Thus, with HIP welding, flange 84 is metallurgically bonded to sheath 76, and shaft 82 is metallurgically bonded to element 74 to provide a laminated feeder fiberization wall 14 wherein the tubular member 80 is in good electrical and thermal contact with laminate 69.

As shown in FIG. 5, modified laminate 69, having core 70, element 74, sheath 76 fabricated as set forth herein, is provided with a hollow tubular member 80 depending from one side of sheath 76. Preferably, member 80 is attached to the non-glass contacting side of the fiber forming feeder.

As such, flange 84 can be welded to sheath 76 by any suitable means such as resistance, electron beam, laser, or HIP welding.

Since refractory metals are highly creep resistant, or even substantially "creep" free, even at elevated temperatures, fiber forming feeders produced according to the principles of this invention have good "sag" resistance. That is, the fiberization walls should not deform or bow as much as an all precious metal feeder. In some instances "sag" can be substantially eliminated over the life of the feeder. Thus finshield alignments and the like with respect to the fiberization wall and/or tips can remain essentially fixed over the life of the feeder.

Similarly, a rotary feeder 50 can be fabricated from a laminate 89 comprised of a refractory metal core or substrate 90 intimately bonded to precious metal sheath 96 by means of hot isostatic pressing. The fabrication steps for the rotary feeder are substantially the same as the foregoing disclosed for feeder 10 wherein aperture 92 is first formed in substrate 90 with element or insert 94 being press fit or snugly positioned therein.

Then, a sheath is formed around core 90 having element 94 inserted therein. After HIP'ing, orifice 98 can be formed in element 94 to permit the passage of molten glass therethrough. Preferably, there should be no points at which the core is exposed to an oxidizing medium or atmosphere. That is, orifice 98 should be drilled entirely within the cirumferential wall of element 94.

It is to be understood that insert elements 74 and 94 need not be solid plugs of precious metal material, but elements 74 and 94, prior to the insertion thereof in core 70 and core 90, may have passageways 83 and 98 previously established therein. Further, the fiberization wall 54 may be adapted with elements 84 and/or 94 if desired.

Other systems for producing a feeder working wall having a precious metal liner insert or tubular member associated therewith are found in concurrently filed patent applications: Ser. No. 200,650, filed on Oct. 27, 1980, in the names of Mohinder S. Bhatti and Alfred Marzocchi; Ser. No. 200,647, filed on Oct. 27, 1980 in the name of Mohinder S. Bhatti; Ser. No. 200,651, filed on Oct. 27, 1980, in the name of Mohinder S. Bhatti, all of which are hereby incorporated by reference.

It is apparent that within the scope of the invention, modifications and different arrangements can be made other than an herein disclosed. The present disclosure is merely illustrative with the invention comprehending all variations thereof.

INDUSTRIAL APPLICABILITY

The invention disclosed herein is readily applicable to the glass fiber industry.

We claim:

1. A laminated wall for a feeder for supplying streams of molten glass to be attenuated into filaments comprising:
   a refractory metal core having an oxygen impervious, precious metal sheath having interior surfaces intimately bonded thereto by hot isostatic pressing to form a laminate, and an element positioned in said core having at least one orifice extending therethrough adapted to permit said molten material to pass therethrough, said element having end surfaces sealed to the interior surfaces of said sheath.

2. The feeder wall of claim 1 wherein said end surfaces are substantially flush with the exterior of said core.

3. The feeder wall of claim 2 further comprising a tubular member joined at the orifice to define a stream of molten glass.

4. The feeder wall of claims 1 or 3 wherein the core is a material selected from the group consisting of Ti, V, Cb, Ta, Cr, Mo, W, Re and base alloys thereof and wherein said sheath is a material of the group consisting of Pt, Pd, Ir, Os, Rh, Ru and base alloys thereof.

5. The feeder wall of claim 1 wherein said refractory metal is an alloy of Mo, Ti, and Zr.

6. The feeder wall of claim 5 wherein said sheath is an alloy of Pt and Rh.

7. The feeder wall of claim 3 wherein said tubular member is located at least partially within said orifice, said member having a passageway therethrough, said member being precious metal.

8. The method of making a laminated wall for an inorganic fiber forming feeder comprising:
   supplying a refractory metal core;
   forming at least one aperture through said core;
   inserting an element having an end surface in said aperture;
   supplying an oxygen impervious, precious metal, first layer having a shape generally conforming to the shape of the core, said first layer having a surface to be bonded to said core;
   and hot isostatically pressing said core and first layer to intimately bond said surface of the first layer to the core and to intimately bond said end surface to said surface of said first layer to form said laminated wall; and
   providing at least one orifice through said element adapted to permit the flow of molten inorganic material therethrough.

9. The feeder wall of claim 1 further comprising a hollow tubular member attached to said laminate at said orifice to define the stream of molten glass.

10. The method of making a laminated wall for an inorganic fiber forming feeder comprising:
    supplying a refractory metal core;
    forming at least one aperture through said core;
    inserting an element having end surfaces in said aperture;
    supplying an oxygen impervious, precious metal sheath having a shape generally conforming to the shape of the core, said sheath having interior surfaces;
    inserting said core having said element therein into said sheath;
    and hot isostatically pressing said core and sheath to intimately bond the sheath to the core and to intimately bond said end surfaces to said interior surfaces to form said laminated wall; and
    providing at least one orifice through said element adapted to permit the flow of molten inorganic material therethrough.

11. The method of claim 10 wherein said orifice is formed in said element subsequent to hot isostatically pressing the core and sheath together.

12. The method of claims 10 or 11 further comprising joining a hollow tubular member to said wall at said orifice, said member being adapted to define the flow of said molten inorganic material therethrough.

13. The method of claim 11 further comprising after forming said orifice, hot isostatically pressing the structure a second time to heal structural defects in the wall.

14. The method of claim 12 wherein said tubular member is positioned, at least partially, in said orifice and are sealed to said sheath.

15. The method of claim 14 wherein said tubular member has a flange, said flange being sealed to said wall at the molten material contacting side of said wall.

16. The method of claim 15 wherein said tubular member has a shaft, said shaft being sealed to said element.

17. The feeder wall produced according to the method of claims 10, 14, 16 or 8.

18. The method of forming glass fibers comprising:
    providing a refractory metal core having an oxygen impervious, precious metal sheath having interior surfaces intimately bonded thereto by hot isostatic pressing, and an element positioned in said core having at least one orifice extending therethrough adapted to permit said molten glass to pass therethrough as a stream, said element having end surfaces intimately bonded to the interior surfaces of said sheath,
    attenuating the stream of molten glass into a fiber.

19. The method of claim 18 further comprising: providing a precious metal member sealed to said sheath in said orifice; said member having at least one passageway extending therethrough to define a stream of molten glass.

20. The method of claim 8 further comprising supplying an oxygen impervious, precious metal, second layer, said second layer having a surface to be bonded to said core, and hot isostatically pressing said core and said second layer to intimately bond said surface of the second layer to the core and to intimately bond another end surface of said element to said surface of the second layer.

21. The wall of claim 1 wherein said feeder is stationary.

22. The wall of claim 1 wherein said feeder is rotatable.

23. A laminated wall for a feeder for supplying streams of molten glass to be attenuated into filaments comprising:

a refractory metal core having an oxygen impervious, precious metal, first layer having a first surface intimately bonded thereto by hot isostatic pressing to form a laminate, and an element positioned in said core having at least one orifice extending therethrough adapted to permit said molten glass to pass therethrough, said element having an end surface sealed to said first surface of said first layer.

24. The feeder wall of claim 23 further comprising an oxygen impervious, precious metal, second layer having a first surface intimately bonded to the core by hot isostatic pressing on the side of the core opposite the first layer, said element having another end surface bonded to the first surface of said second layer.

* * * * *